H. E. TOWNSEND.
WATER HEATER.
APPLICATION FILED JAN. 7, 1911.

1,001,096.

Patented Aug. 22, 1911.
2 SHEETS—SHEET 1.

WITNESSES:

INVENTOR
Harry E. Townsend.

H. E. TOWNSEND.
WATER HEATER.
APPLICATION FILED JAN. 7, 1911.

1,001,096.

Patented Aug. 22, 1911.
2 SHEETS—SHEET 2.

WITNESSES:

INVENTOR
Harry E. Townsend

UNITED STATES PATENT OFFICE.

HARRY E. TOWNSEND, OF NEW YORK, N. Y.

WATER-HEATER.

1,001,096.  Specification of Letters Patent.  Patented Aug. 22, 1911.

Application filed January 7, 1911. Serial No. 601,476.

*To all whom it may concern:*

Be it known that I, HARRY E. TOWNSEND, a citizen of the United States, and a resident of New York, borough of Brooklyn, and State of New York, have invented certain new and useful Improvements in Water-Heaters, of which the following is a specification.

My invention relates to water-heaters of the partially submergible type, suitable for heating water in bath-tubs, etc., and it consists in the novel construction and arrangement of parts fully described hereinafter and then claimed.

Figure 3:
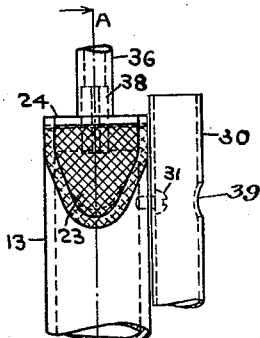
Figure 4:
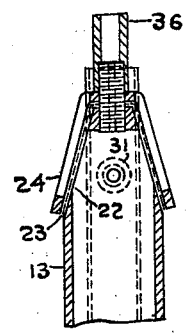
Figure 1:
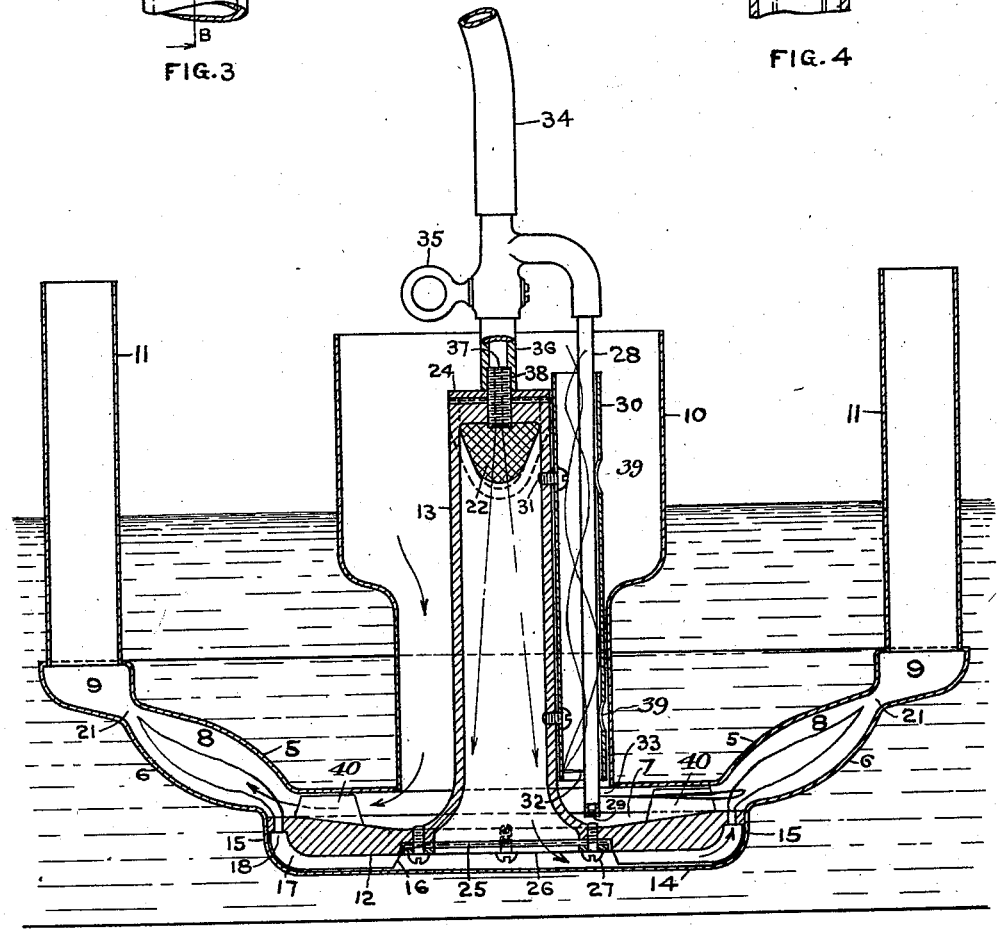
Figure 5:
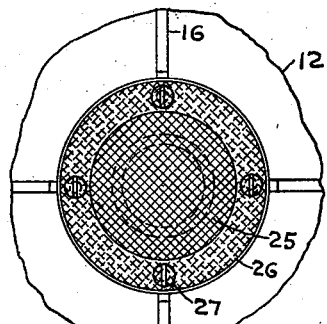
Figure 6:
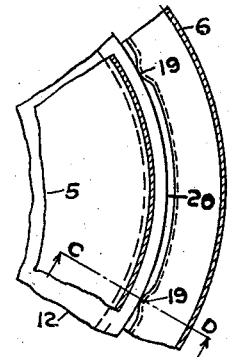
Figure 2:
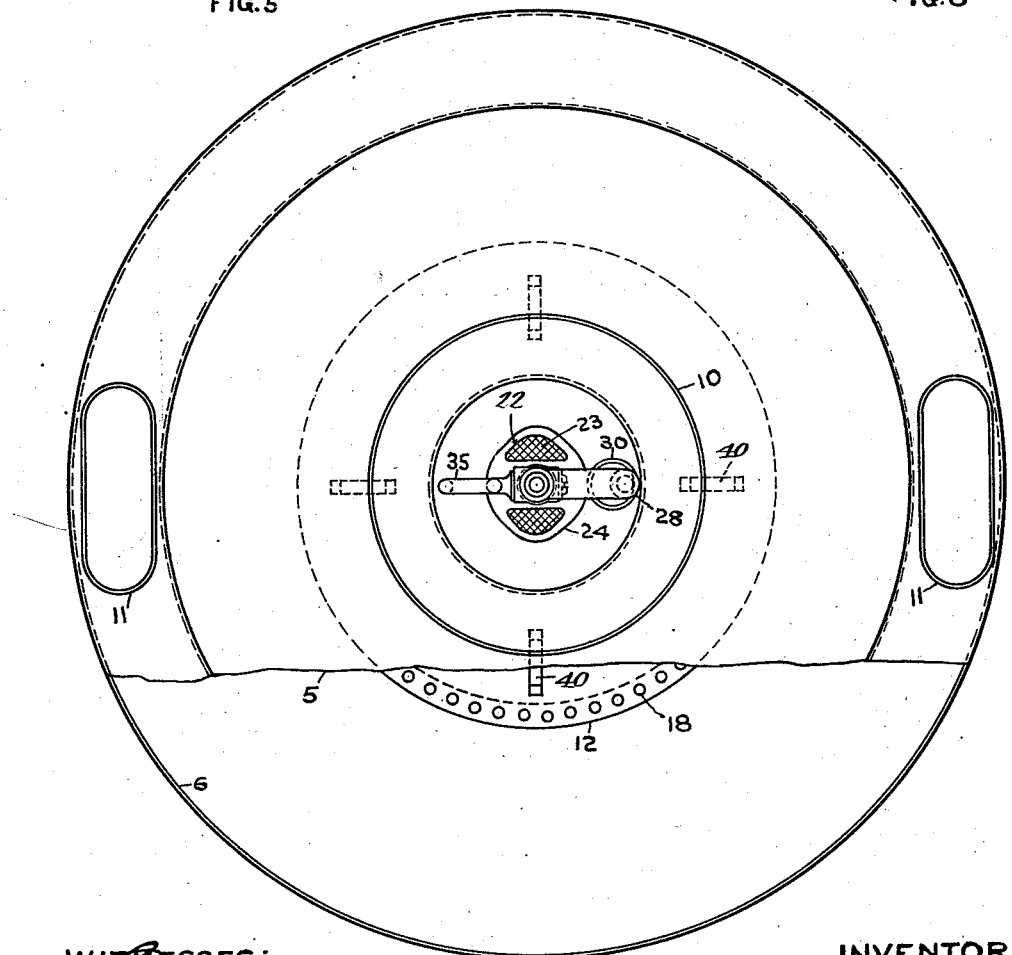

Referring to the drawings, Figure 1 is a central vertical section of a heater constructed according to my invention; Fig. 2 is a plan view of the same showing the upper portion of the casing partly broken away to afford a partial view of the burner; Fig. 3 is a side elevation of the upper end of the mixer portion of the burner; Fig. 4 is a sectional view taken on the line A—B Fig. 3; Fig. 5 is a bottom plan view of the central portion of the burner; Fig. 6 is a horizontal sectional view taken on the line E—F Fig. 7 illustrating a different arrangement of burner and casing to that shown in Figs. 1 and 2; and Fig. 7 is a vertical sectional view of the same taken on the line C—D Fig. 6.

The casing of the heater comprises the upper and lower dishlike portions 5 and 6, joined at their outer edges and elsewhere spaced apart to provide therebetween the burner space 7, the annular combustion space 8, and the annular air passage 9. To the upper wall 5 are attached the central down-draft flue 10 and the escape flues 11.

The disklike casting 12, together with the vertical gas and air mixer 13, rising concentrically therefrom and cast integrally therewith, constitute the burner. The burner space 7 is formed by the flat bottom portion 14 of the casing, and the vertical walls 15 rising therefrom. Into this space the casting 12 is fitted, being held a suitable distance from the bottom of the casing by the ribs 16 cast on its under side, so as to provide a passage 17 from the mixer 13, to the drilled holes 18, which serve as outlets for the escape of the gas from beneath the burner to the combustion space 8.

Figure 7:
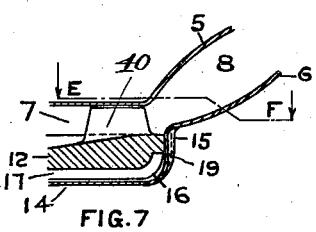

Figs. 6 and 7 illustrate a means of construction in which the burner is not provided with the drilled holes 18, as shown in Figs. 1 and 2. In this construction the outer circumference of the burner is slightly spaced away from the vertical walls 15 of the casing and is held in place by the slight indentations 19 in the said vertical walls, so as to provide the narrow annular passage 20, through which the gas escapes to the combustion space 8.

From the central down-draft flue the upper portion 5 of the casing extends outwardly over the burner nearly to its outer circumference and is spaced slightly therefrom by the ribs 40 cast on the upper side of the burner to provide a narrow air passage from the down-draft flue 10 to the combustion chamber 8. This construction affords the advantage of causing the air supporting the combustion to be brought into contact with the hot upper surface of the burner and thus heated to a considerable extent before entering the combustion chamber. The contracted area of the said air passage at the annular line adjacent the outer circumference of the burner presents the further advantage of causing all of the air passing through the heater to be brought into direct contact with the gas as it is discharged from the burner, thus causing the air and gas to be thoroughly commingled, and resulting in rapid and complete combustion.

From the outer circumference of the burner both upper and lower walls of the casing extend upwardly and outwardly and are spaced a suitable distance apart to provide the combustion space 8 and the annular air passage 9. Between the said combustion space and the said annular air passage the upper and lower walls of the casing are brought close together to provide a narrow annular passage 21, of such limited area that substantially its entire length is required to admit of the passage therethrough of the heated air from the combustion chamber on its way to the escape flues, thus causing it to be spread around substantially the entire length of the annular passage 9, and so utilizing to the greatest possible extent all of the available heating surface.

To prevent the gas from igniting within the mixer 13, the cored holes 22 for the admission of air to the mixer are covered by the wire gauze screen 23, held in place by the retainer 24, having openings to correspond with the cored holes 22.

In a heater of this type it is desirable that the combustion space, air passages, etc., be made as small as possible, so that the displacement and therefore the weight of the heater may be kept within practicable limits. In order that the gas may burn without smoke or odor within the limited space provided it is important that as much air as possible be mixed with the gas before combustion. In gas burners as ordinarily constructed, however, the proportion of air that can be mixed with the gas before combustion is limited by the tendency of the burner to "flash back" and cause the gas to burn within the mixer. This tendency is obviated in the construction shown by having the lower end of the mixer 13 covered by the wire gauze screen 25, held in place by the ring 26, secured to the burner by the screws 27; the passage 17 being too narrow to admit of combustion being maintained within it.

The "pilot" or igniting device consists of the small pipe 28, connected at its upper end with the gas supply pipe, and closed at its lower end by the plug 29; and the incasing tube 30, which is left open at both ends, and is secured to the gas inlet portion of the burner by the screws 31, the drilled holes 39 in the tube 30, being provided to afford access to the said screws. The lower end of the tube 30 terminates about on a level with the lower end of the down-draft flue 10, while the pipe 28 extends some distance lower. The pipe 28 has two small drilled holes 32 and 33, the lower of which discharges gas across the upper surface of the burner to the outer circumference thereof, while the other discharges gas within the tube 30, whence it rises to the top of the said tube, which is of a convenient height to be reached with a match or taper.

The weight of the heater is so proportioned to the displacement that it will float when the safe limit of submergence has been reached, and in order that it may float as nearly as possible in an upright position, the upper end of the down-draft flue 10 is made of considerably larger diameter than the lower, the resulting greater displacement of this portion tending to raise the center of buoyancy of the heater and give it stability when floating.

The mode of operation is as follows: The heater is placed in the water to be heated, and connected by the flexible tube 34 with any convenient gas supply, the cock 35 in the feed pipe 36 being closed. Gas is admitted to the pipe 28, from which it is discharged through the holes 32 and 33; that from the hole 32 being discharged within the incasing tube 30 rises to the top of the same, where it is ignited by means of a match or taper. The igniting flame is instantly communicated to the bottom of the tube 30, igniting the gas issuing from the drilled hole 33, the resulting flame reaching to the outer circumference of the burner, as shown in Fig. 1. Gas is next admitted to the mixer 13, through the drilled hole 37, in the nipple 38, by opening the cock 35. Air to mix with the gas is drawn into the mixer through the cored holes 22. The resulting mixture passes under the casting 12, and issuing from the drilled holes 18, shown in Figs. 1 and 2, or from the annular passage 20 as shown in Figs. 6 and 7, according to whichever means of construction is employed, is ignited on coming into contact with the burning gas from the pipe 28, after which the heater will require no further attention until the water has been heated to the desired temperature.

Having described my invention, what I claim as new and desire to secure by Letters-Patent is:

1. In a water-heater, the combination of a casing and a burner centrally arranged therein, said casing consisting of upper and lower members of disklike contour, joined at their outer edges and elsewhere spaced apart to provide therebetween a space for the burner and a combustion space and being upwardly inclined from the burner to their outer circumferences, a central down-draft flue, and escape flues communicating with the said combustion space.

2. In a water-heater, the combination of a casing and a burner centrally arranged therein, said casing consisting of upper and lower walls spaced apart to provide therebetween a space for the burner and a combustion space and being upwardly and outwardly extended from the burner to their outer circumferences, a central down-draft flue, and escape flues communicating with the said combustion space.

3. In a water-heater the combination of a casing and a burner centrally arranged therein, said casing consisting of upper and lower walls joined at their outer edges and elsewhere spaced apart to provide therebetween a space for the burner and a combustion space, a central down-draft flue attached to the upper wall of the casing, and escape flues attached to the said upper wall of the casing at or near its outer circumference, the said outer circumference being at a level slightly above the lower end of the down-draft flue.

4. In a water-heater the combination of a casing and a burner centrally arranged therein, a central down-draft flue attached to the casing, said casing comprising upper and lower walls spaced apart to provide therebetween a space for the burner, an annular combustion space located without the outer periphery of the burner and a radial air passage connecting the down-draft flue and the said combustion space, escape flues communicating with the said combustion space and having their lower ends at a level above the lower end of the down-draft flue.

5. In a water-heater, the combination of a casing and a burner centrally arranged therein, the said casing comprising upper and lower walls spaced apart to provide therebetween a space for the burner and a combustion space located exteriorly to the burner, a central down-draft flue attached to the upper wall of the casing, the portion of the said upper wall of the casing between the down-draft flue and the outer periphery of the burner being slightly spaced above the said burner to provide a narrow radial air passage connecting the combustion space and the down-draft flue, and escape flues communicating with the said combustion space.

6. In a water-heater, the combination of a casing and a burner centrally arranged therein, said casing comprising upper and lower walls spaced apart to provide a space for the burner, a combustion chamber and an annular air passage located exteriorly to the combustion chamber, the said upper and lower walls of the casing being closely spaced at an annular line between the said combustion chamber and the said annular air-passage, a central down-draft flue, and escape flues communicating with the said annular air passage.

7. In a water-heater, the combination of a burner and a casing, the said burner consisting of a disklike portion, with a gas and air mixer rising concentrically therefrom, the said casing having a recess in its bottom portion of suitable size and shape to receive the disklike portion of the burner, the said burner and the bottom of the recessed portion of the casing being spaced apart to provide therebetween a passage for the air and gas from the mixer, and suitable gas outlets at or near the outer circumference of the burner, all substantially as shown and described.

8. In a water-heater, the combination of a casing having a recess in its bottom portion, a burner consisting of a disk or plate adapted to fit into the said recess, the said burner and the bottom of the recessed portion of the casing being spaced apart to provide therebetween a passage for gas, means for supplying gas to the said passage, and suitable outlets for the escape of gas from the said passage.

9. In a submergible heater the combination with a burner and a casing of an igniting device comprising a gas pipe connected at its upper end with a gas supply and having its lower end in communication with the combustion chamber of the heater, a tube of larger diameter having openings at or near its upper and lower ends encompassing the said gas pipe, the said gas pipe having a gas outlet at or near its lower end arranged to discharge gas within the said tube.

10. In a water-heater adapted to float while partly submerged, the combination of a casing, a vertical flue attached to the casing and rising concentrically therefrom, the said flue being enlarged from its upper end to a point some distance below the surface of the water when the heater is in the floating position, substantially as shown for the purpose specified.

In testimony whereof, I have signed this specification in the presence of two subscribing witnesses.

HARRY E. TOWNSEND.

Witnesses:
EDUARD BEGGS,
ERNEST P. WARTENBERG.

---

Copies of this patent may be obtained for five cents each, by addressing the "Commissioner of Patents, Washington, D. C."